US009192855B2

(12) United States Patent  
Gagner et al.

(10) Patent No.: US 9,192,855 B2  
(45) Date of Patent: Nov. 24, 2015

(54) MANAGING GRANT OF DIGITAL ACHIEVEMENTS

(71) Applicant: WMS Gaming, Inc., Waukegan, IL (US)

(72) Inventors: Mark B. Gagner, West Chicago, IL (US); Damon E. Gura, Chicago, IL (US); Krishnakumar Meluveettil, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/052,260

(22) Filed: Oct. 11, 2013

(65) Prior Publication Data

US 2014/0051508 A1 Feb. 20, 2014

Related U.S. Application Data

(62) Division of application No. 13/125,356, filed as application No. PCT/US2009/061384 on Oct. 20, 2009, now Pat. No. 8,568,212.

(60) Provisional application No. 61/107,004, filed on Oct. 21, 2008.

(51) Int. Cl.
*G07F 17/32* (2006.01)
*A63F 13/00* (2014.01)
*G06Q 50/34* (2012.01)

(52) U.S. Cl.
CPC .............. *A63F 13/00* (2013.01); *G06Q 50/34* (2013.01)

(58) Field of Classification Search
CPC ..... A63F 13/00; G06Q 50/34; G07F 17/3227; G07F 17/3267

USPC ............................................................ 463/1
See application file for complete search history.

(56) References Cited

U.S. PATENT DOCUMENTS 6,349,301 B1 2/2002 Mitchell et al.
6,352,479 B1 3/2002 Sparks, II (Continued)

FOREIGN PATENT DOCUMENTS

JP 2003030368 1/2003
WO WO-2010048231 4/2010

OTHER PUBLICATIONS

"PCT Application No. PCT/US09/61384 International Preliminary Report on Patentability", Oct. 1, 2010, 8 pages.

(Continued)

*Primary Examiner* — Corbett B Coburn
(74) *Attorney, Agent, or Firm* — DeLizio Law, PLLC (57) ABSTRACT

A system for granting and managing dynamic digital achievements can grant dynamic digital achievements in a controlled manner to encourage player participation in wagering game establishments. A dynamic digital achievement lives beyond an initial grant and can exhibit different behaviors over time and/or in combination with other digital achievements. The dynamic digital achievements can comprise an image, a sequence of images, video, executable code, audio, etc. The dynamic behavior of a digital achievement can increase interest in the digital achievement, thus increasing interest in the corresponding activity, whether wagering game activity or non-wagering game activity. Moreover, the system for granting and managing dynamic digital achievements is not limited to wagering game networks. The system can interface with other vendor systems and cause a dynamic digital achievement to exhibit behavior based on activity by a player in a non-gaming environment.

22 Claims, 8 Drawing Sheets

(56) References Cited

U.S. PATENT DOCUMENTS

| | | |
|---|---|---|
| 7,837,555 B2 | 11/2010 | Cowan et al. |
| 7,871,326 B2 | 1/2011 | Wright et al. |
| 2002/0016202 A1* | 2/2002 | Fertitta et al. ............ 463/25 |
| 2006/0217202 A1 | 9/2006 | Burke et al. |
| 2008/0305853 A1 | 12/2008 | Roitman |
| 2010/0216536 A1* | 8/2010 | Gagner et al. ............ 463/16 |
| 2011/0201415 A1 | 8/2011 | Gagner et al. |
| 2011/0207525 A1* | 8/2011 | Allen et al. ............ 463/25 |

OTHER PUBLICATIONS

"PCT Application No. PCT/US09/61384 International Search Report", Dec. 8, 2009, 8 pages.

* cited by examiner

FIG. 8

MANAGING GRANT OF DIGITAL ACHIEVEMENTS

RELATED APPLICATIONS

This application is a divisional application that claims benefit of U.S. application Ser. No. 13/125,356 which is a National Stage Application of PCT/US09/61384 filed 20 Oct. 2009, which claims priority benefit of Provisional U.S. Application No. 61/107,004 filed 21 Oct. 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to wagering game systems, and, more particularly, to living digital achievements.

BACKGROUND

Game developers have enlisted progress tracking mechanisms to reward players for playing games. A game rewards points a player upon the completion of a task, mission, challenge, etc. This point based progress tracking mechanism allows players to establish a game playing reputation based on point accumulation. In addition, a player can use points to purchase awards, such as locked game items.

BRIEF DESCRIPTION OF THE FIGURES

Embodiments of the invention are illustrated in the Figures of the accompanying drawings in which.

DESCRIPTION OF THE EMBODIMENTS

The description that follows includes example systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

A system (i.e., one or more machines and one or more processes executing on the one or more machines) for granting and managing dynamic digital achievements can grant dynamic digital achievements in a controlled manner to encourage player participation in wagering game establishments. A dynamic digital achievement lives beyond an initial grant and can exhibit different behaviors over time and/or in combination with other digital achievements. The dynamic digital achievements can comprise an image, a sequence of images, video, executable code, audio, etc. The dynamic behavior of a digital achievement can increase interest in the digital achievement, thus increasing interest in the corresponding activity, whether wagering game activity or non-wagering game activity. The system can manage grant/distribution of dynamic digital achievements as limited resources to further foster excitement and interest. Moreover, the system for granting and managing dynamic digital achievements is not limited to wagering game networks. The system can interface with other vendor systems and cause a dynamic digital achievement to exhibit behavior based on activity by a player in a non-gaming environment (e.g., purchasing activity in a café or retail store).

Figure 1:
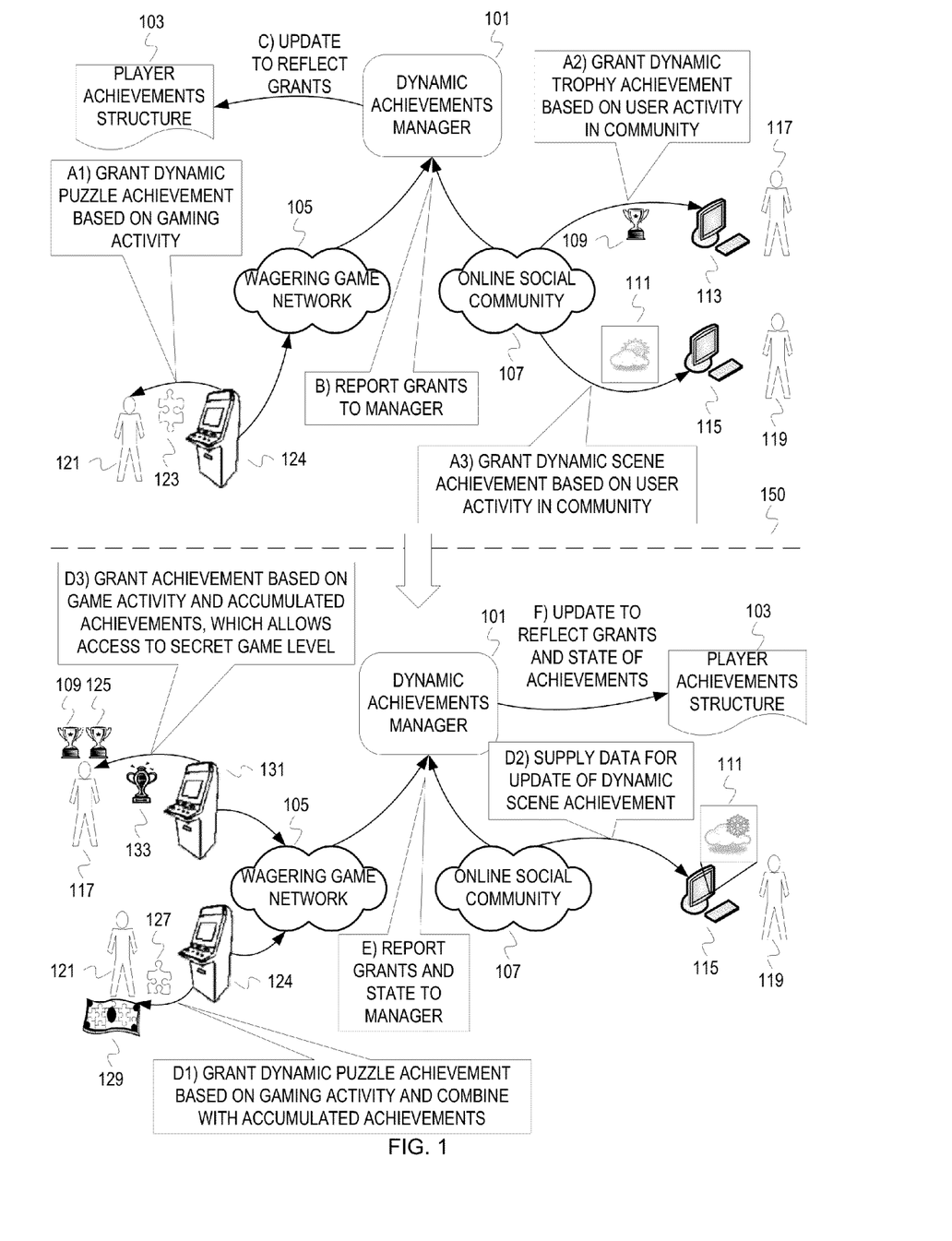
FIG. 1 depicts a conceptual diagram of a dynamic achievements manager managing granting of dynamic digital achievements.

FIG. 1 depicts a conceptual diagram of a dynamic achievements manager managing granting of dynamic digital achievements. FIG. 1 depicts a dashed line 150 that separates a first group of activities depicted above the dashed line 150 from a second group of activities depicted below the dashed line 150. The first group of activities occurs in a first time frame before the second group of activities, which occur in a second time frame. Over the two different time frames, users 117, 119, and 121 accumulate dynamic digital achievements.

In the first stage, the users 117, 119, and 121 receive dynamic digital achievements 109, 111, and 123, respectively. At a stage A1, an electronic wagering game machine 124 grants the dynamic digital achievement 123 (a digital puzzle piece) to the user 121 based on gaming activity (e.g., the gaming machine displays the digital puzzle piece 123 on the electronic wagering game machine 124 while the user 121 is logged in). The electronic wagering game machine 124 may grant the dynamic digital achievement 123 when the user 121 hits a particular reel combination, wins a certain amount of money, etc. At a stage A2, an online social community 107 (i.e., one or more servers/processes that support/facilitate an online social community) grants the dynamic digital achievement 109 (a digital trophy) to the user 117 based on user activity in the online social community 107. A computer 113 of the user 117 renders the digital trophy 109. The online social community 107 may grant the dynamic digital achievement 109 when the user 117 achieves a certain reputation level, wins an online game, contributes to the online social community, etc. At a stage A3, the online social community 107 grants a dynamic digital achievement 111 (a dynamic scene achievement) to the user 119 based on user activity in the online social community 107. A computer 115 of the user 119 renders the dynamic scene achievement 111, which is a sunny sky, perhaps corresponding to a current time of year for the user 119.

At a stage B, a dynamic achievements manager 101 receives reports of these grants. The electronic wagering game machine 124 reports via a wagering game network 105 that the dynamic digital achievement 123 has been granted to the user 121. The online social community 107 reports that the dynamic digital achievement 109 has been granted to the user 117 and that the dynamic digital achievement 111 has been granted to the user 119. These reports can comprise various information, for example, user names, user identifiers, account numbers, achievement identifiers, achievement classes, achievement serial numbers, etc. The dynamic achievements manager 101 processes these reports and updates a player achievements structure 103 to reflect the grants at a stage C.

In the second time frame, the users 117, 119, and 121 receive additional dynamic digital achievements or updates to their previously granted dynamic digital achievements. At a stage D1, the electronic wagering game machine 124 grants a dynamic digital puzzle piece achievement 127 to the user 121 based on gaming activity. The achievement 127 is combined with other puzzle piece achievements accumulated by the user 121, including the previously granted puzzle piece achievement 123. Combining the accumulated puzzle piece achievements creates a dynamic digital achievement 129 (a money puzzle). The user 121 can exchange the money puzzle achievement 129 for a reward (e.g., credit in a restaurant, free spins, a souvenir, discount tickets for a show, etc.), save the money puzzle 129 for combination with subsequently granted achievements (assuming the particular achievement 129 is permitted to be further combined), etc. At a stage D2, the online social community 107 supplies data for update of the dynamic digital scene achievement 111 to the computer 115, previously granted to the user 119. The data causes the dynamic digital scene achievement 111 to change from a summer sky graphic to a winter sky graphic. Although FIG. 1 depicts dynamic digital achievement data being supplied to the computer 115, embodiments are not so limited. Update data can be supplied to a machine designated by the user 119, a machine currently associated with the user 119, etc. Further, examples of machines that can process dynamic digital achievements include mobile phones, personal data assistances, tablets, portable wagering game machines, etc. At a stage D3, an electronic wagering game machine 131 grants a dynamic digital trophy achievement 133 to the user 117 based on gaming activity. The dynamic digital trophy achievement 133 unlocks a secret game level. A game developer can implement the unlocking mechanism differently. The dynamic digital trophy achievement 133 may unlock one or more game enhancements and/or levels in combination with the dynamic digital trophy achievement 109 and a dynamic digital trophy achievement 125 previously granted to the user 117. As another example implementation, the digital trophy 133 may unlock the secret game level without the trophies 109 and 125. But the electronic wagering game machine 131 will not grant the trophy 133 unless a player already possesses the trophies 109 and 125. Additional conditional can also be placed on granting of a dynamic digital achievement (e.g., particular status at a wagering game establishment, certain number of game activities, amount wagered, etc.).

At a stage E in the second time frame, the achievement grants and/or states of the achievements are reported to the dynamic achievements manager 101. The electronic wagering game machine 124 reports grant of the puzzle piece achievement 127 and creation of the money puzzle achievement 129 for the user 121 to the dynamic achievements manager 101 via the wagering game network 105. The electronic wagering game machine 131 reports grant of the trophy achievement 133 via the wagering game network 105. The electronic wagering game machine 131 may also report to the dynamic achievements manager 101 that the user 121 has access to a secret game level for a wagering game with the grant of the trophy achievement 133. The online social community 107 reports state of the scene achievement 111 after the update of the scene achievement 111 to the dynamic achievements manager 101.

At a stage F, the dynamic achievements manager 101 processes the reports from the electronic wagering game machines 124, 131 and the online social community 107. The dynamic achievements manager 101 updates the player achievements structure 103 to reflect the grants and/or states of achievements. The dynamic achievements manager 101 updates the structure 103 to associate the user 117 with the trophy achievements 125 and 133. The dynamic achievements manager 101 updates the structure 103 to associate the user 121 with the puzzle piece achievement 127 and the money puzzle achievement 129. The dynamic achievements manager 101 updates the structure 103 to update state of the scene achievement 111 (already associated with the user 119) to indicate depiction of a winter sky. The dynamic achievements manager 101 can also update the structure 103 to indicate what granted an achievement and/or where an achievement was granted. For example, the dynamic achievement manger 101 updates the structure 103 to indicate that the scene achievement was granted from the online social community 107 and to the machine 115. As another example, the dynamic achievements manager 101 can update the structure 103 to indicate granting of achievements by the electronic wagering game machines 131, 124, and perhaps corresponding wagering game establishment(s).

Figure 2:
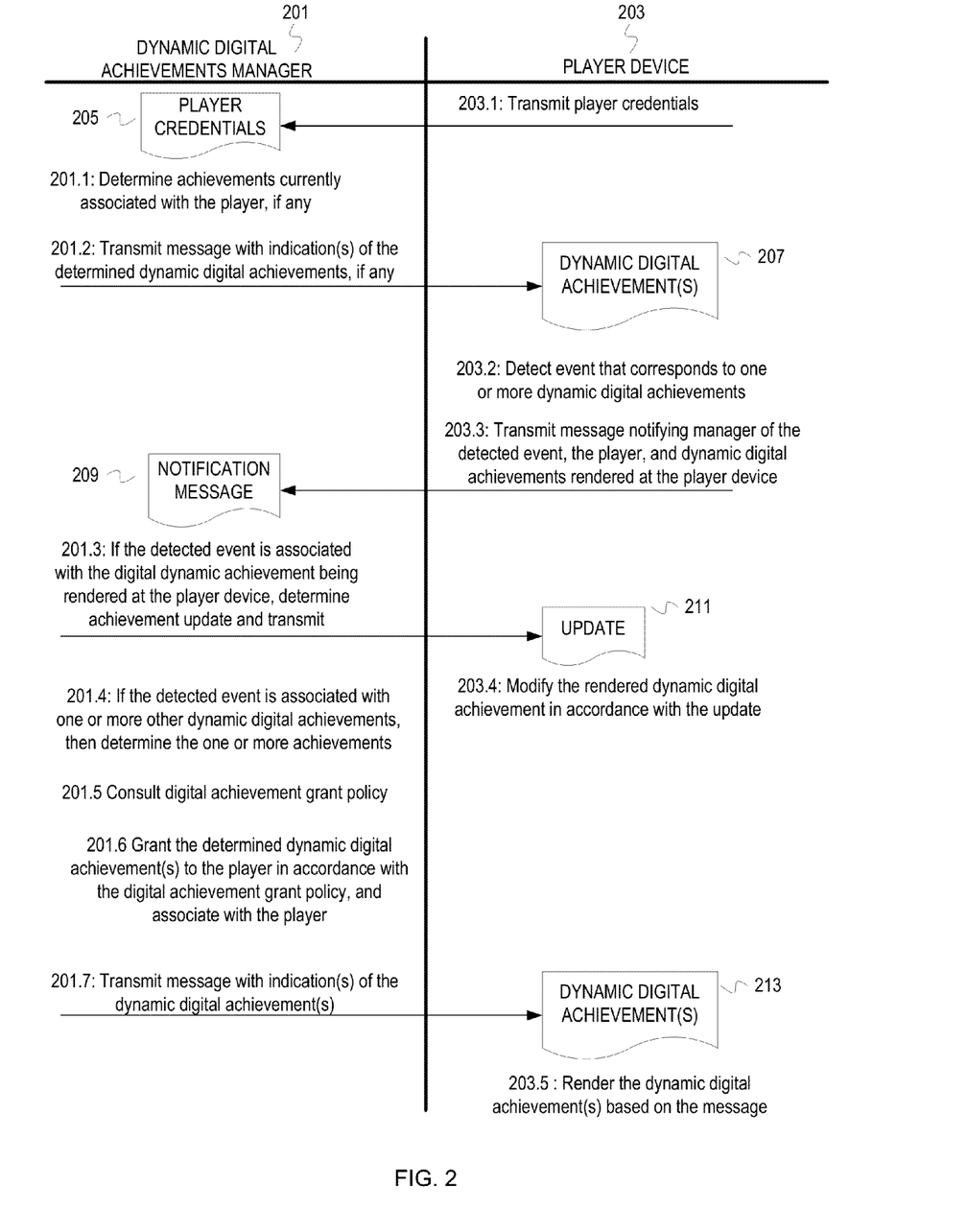
FIG. 2 depicts message exchange for centralized granting of dynamic digital achievements.
Figure 3:
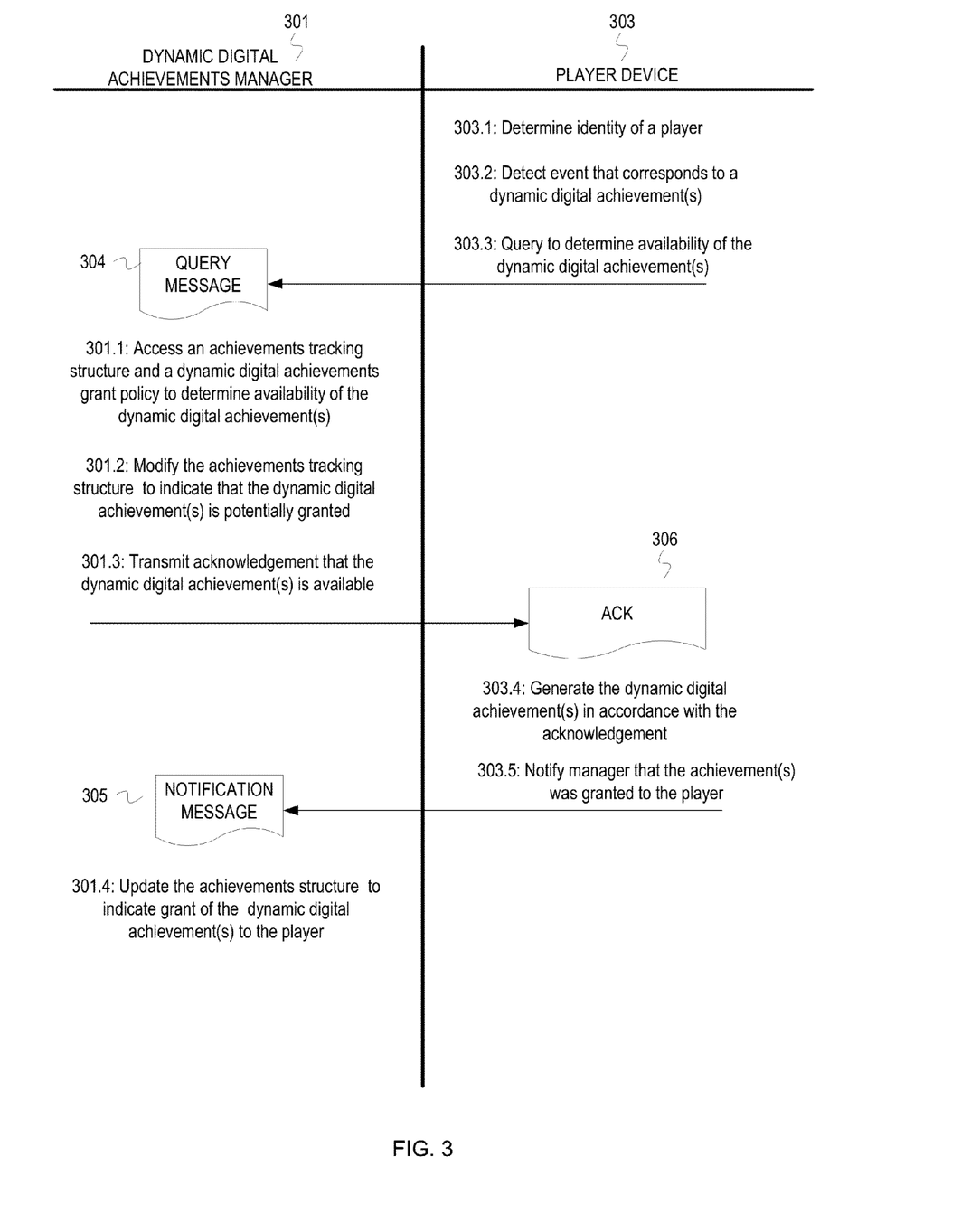
FIG. 3 depicts message exchange for distributed achievement granting in accordance with a central regulator.

Although FIG. 1 depicts a variety of example dynamic digital achievements being granted in different venues by different entities, embodiments can implement the granting mechanism differently. FIG. 1 depicts distributed granting from electronic wagering game machines and a machine/process associated with an online social community. Embodiments can implement centralized granting of achievements, distributed granting of achievements regulated by a central entity, etc. Embodiments can manage achievements in accordance with policies, configurations, etc. FIGS. 2 and 3 depict examples of different granting mechanisms.

FIG. 2 depicts message exchange for centralized granting of dynamic digital achievements. A player accesses a player device 203 (e.g., wagering game machine, mobile phone, computer, game console, etc.) with credentials. The player may access the player device 203 with a player card, biometric data, a user name and password, etc. At 203.1, the player device 203 transmits player credentials 205 to a dynamic digital achievements manager 201.

At 201.1, the dynamic digital achievements manager 201 determines achievements currently associated with the player of the player credentials 205. For example, the dynamic digital achievements manager 201 uses the player credentials or some value associated with or derived from the player credentials to access a player achievements structure. If an entry exists that indicates at least one dynamic digital achievement associated with the player, then the dynamic digital achievements manager 201 creates a message, or a payload for a message, that indicates the associated dynamic digital achievements. The dynamic digital achievements manager 201 may determine that no achievements have been granted to the player.

At 201.2, the dynamic digital achievements manager 201 supplies an indication(s) of the determined dynamic digital achievements, if any, to the player device 203 in a dynamic digital achievement(s) message 207. The dynamic digital achievement(s) message 207 may comprise the data for rendering the determined digital achievement(s), some data for rendering the determined achievement(s) and references (e.g., network addresses) to other data, etc. The message 207 may comprise an unlock value that allows the player device 203 to render the determined digital achievement(s) with data already residing on the player device, may comprise a password for retrieving the data for the determined digital achievement(s) from a remote location, etc.

At 203.2, the player device 203 detects an event that corresponds to one or more of the determined dynamic digital achievement(s). For example, the player device 203 detects reputation level of a player exceeding a threshold, a particular card combination in a video poker game, a particular reel combination, exceeding a threshold number of logs into an online gaming community, etc.

At 203.3, the player device 203 transmits a notification message 209 to the dynamic digital achievements manager 201. The notification message 209 indicates the detected event, the player, and the dynamic digital achievement(s) rendered at the player device 203.

At 201.3, the dynamic digital achievements manager 201 determines if the detected event is associated with the dynamic digital achievement(s) rendered at the player device 203. If the detected event is associated with the dynamic digital achievement(s) rendered at the player device 203, then the dynamic digital achievements manager 201 determines an update for the dynamic digital achievement(s), and transmits an update message 211 with the update data to the player device 203. An update can comprise one or more of executable code, an image, sequence of images, video, audio, reference to a data stream source, etc.

At 203.4, the player device modifies the rendering of the dynamic digital achievement(s) in accordance with the update data. The player device can overwrite a portion of a dynamic digital achievement with the update, supplement the dynamic digital achievement with the update, modify the dynamic digital achievement with the update, etc. Examples of update data include a value to access code, an address to access a data stream from a remote source, graphical data, animation data, etc.

At 201.4, the dynamic digital achievements manager 201 determines if the detected event is associated with a dynamic digital achievement(s), which is not already being rendered at the player device 203. If the detected event is associated with a dynamic digital achievement(s) not rendered at the player device 203, then the dynamic digital achievements manager 201 can transmit a message to the player device with the corresponding data for the dynamic digital achievement(s). Granting of the dynamic digital achievement(s), however, may be regulated in accordance with one or more policies.

At 201.5, the dynamic digital achievements manager 201 consults a dynamic digital achievements grant policy. The policy may indicate that only a certain number and/or class of the determined dynamic digital achievement(s) can be granted or exist. The policy can require termination of previously granted achievements, addition of the player to a waiting list, etc. Achievements can be created with expiration dates as another mechanism to limit availability of achievements. In addition, the policy can require certain player criteria for a player to be eligible for a dynamic digital achievement (e.g., status awarded by a wagering game establishment, online social community reputation, etc.). The dynamic digital achievements manager 201 can access a structure that indicates availability of a dynamic digital achievement (e.g., availability by serial number, total possible granted, etc.).

If the policy permits grant, then the dynamic digital achievements manager 201 grants the determined dynamic digital achievement(s) in accordance with the policy at 201.6. The dynamic digital achievements manager 201 associates the dynamic digital achievement(s) with the player.

At 201.7, the dynamic digital achievements manager 201 transmits a message 213 with an indication(s) of the dynamic digital achievement(s) to the player device 203.

At 203.5, the player device 203.5 renders the dynamic digital achievement(s) based on the received message (e.g., accesses a data stream indicated in the message 213, loads data from the message 213, downloads data from a source indicated in the message 213, etc.).

FIG. 3 depicts message exchange for distributed achievement granting in accordance with a central regulator. A player device 303 determines an identity of a player at 303.1.

At 303.3, the player device 303 detects an event that corresponds to a dynamic digital achievement(s). For example, a player accumulates winnings that exceed a threshold to be eligible for an achievement.

At 303.3, the player device 303 queries a dynamic digital achievements manager 301 to determine availability of the dynamic digital achievement(s) that corresponds to the detected event. The player device 303 transmits a query message 304 to the dynamic digital achievements manager 301. The query message 304 indicates the player, as well as game and/or the dynamic digital achievement(s).

At 301.1, the dynamic digital achievements manager 301 accesses an achievements tracking structure and a dynamic digital achievements grant policy to determine availability of the dynamic digital achievement(s). For instance, the manager 301 determines from the achievements tracking structure that 294 instances of a digital dynamic achievement have been granted, and the policy allows for 300 instances.

At 301.2, the dynamic digital achievements manager 301 modifies the achievements tracking structure to indicate that the dynamic digital achievement(s) is potentially granted to the player. For example, the dynamic digital achievements manager 301 can create an entry in the achievements tracking structure with a flag that represents potential grant.

At 301.3, the dynamic digital achievements manager 301 transmits an acknowledgement 306 that indicates availability of the dynamic digital achievement(s). The acknowledgement 306 can include a time period for existence of the achievement, termination date, maintenance criteria (e.g., certain number of visits to a wagering game establishment in a given time period), serial number for the achievement, etc.

At 303.4, the player device 303 generates the dynamic digital achievement(s) in accordance with the acknowledgement.

At 303.5, the player device 301 transmits a notification message 305 to the dynamic digital achievements manager 301. The notification message 305 indicates granting of the dynamic digital achievement(s) to the player.

At 301.4, the dynamic digital achievements manager 301 updates the achievements tracking structure to indicate grant of the dynamic digital achievement(s) to the player. For example, the dynamic digital achievements manager 301 changes a flag value from potential grant to grant. Various locking mechanisms can be employed to prevent grants by different game instances and/or machines that violate the policy.

It should be understood that the above figures provide examples and should not be used to limit embodiments or claim scope. For instance, FIGS. 2 and 3 depict a player device sending and receiving messages and performing operation. But an intermediate machine (e.g., wagering game server, online social community server, etc.) can perform some operations, generate some messages, etc. Similarly, embodiments and the scope of claims should not be limited to a centralized dynamic digital achievements manager. Embodiments can employ distributed techniques (e.g., a grid, cloud computing, etc.) to perform the various tasks of handling messages, tracking dynamic achievement grants and states, etc. across multiple processes one or more machines. In addition, player identity is not necessary for achievements. An achievement can be associated with a temporary identity, scratch account, etc. Before terminating the session associated with an achievement (e.g., game session, online social community session, etc.), the dynamic digital achievements manager can offer various possibilities to a user. The achievement(s) can be discarded, associated with a player account (e.g., family member or friend), persist for a period of time before being discarded, associated with a community account, etc. Moreover, the achievement can be associated with a passive identifier that allows a user to collect the achievement later, perhaps after registering. Examples of a passive identifier include a mobile phone number, a global positioning system coordinate, an Ethernet address, RFID tag, a hash of a gaming machine serial number and a card number, etc. Another variation would be to manager dynamic achievements locally without backend support. For instance, an achievement can be managed at a wagering game machine without a server process. The wagering game machine can grant and track achievements, temporarily or long term. A user could recover an achievement with an RFID tag on an anonymous player card at a particular wagering game machine.

Further, embodiments can also grant team oriented achievements. A system can grant an achievement to a team and/or leader of a team based on completion of a team task(s). A team task can involve multiple tasks to be completed individually by team members and/or a task(s) to be completed with coordination of team members. A team leader can also be given an explicit task to complete, perhaps conditioned on completion of individual team member tasks. A team task can be considered implicitly complete with completion of individual team member tasks. A team achievement can be granted to the team (team leader and/or members) upon sufficient/successful completion of the team task(s).

Figure 7:
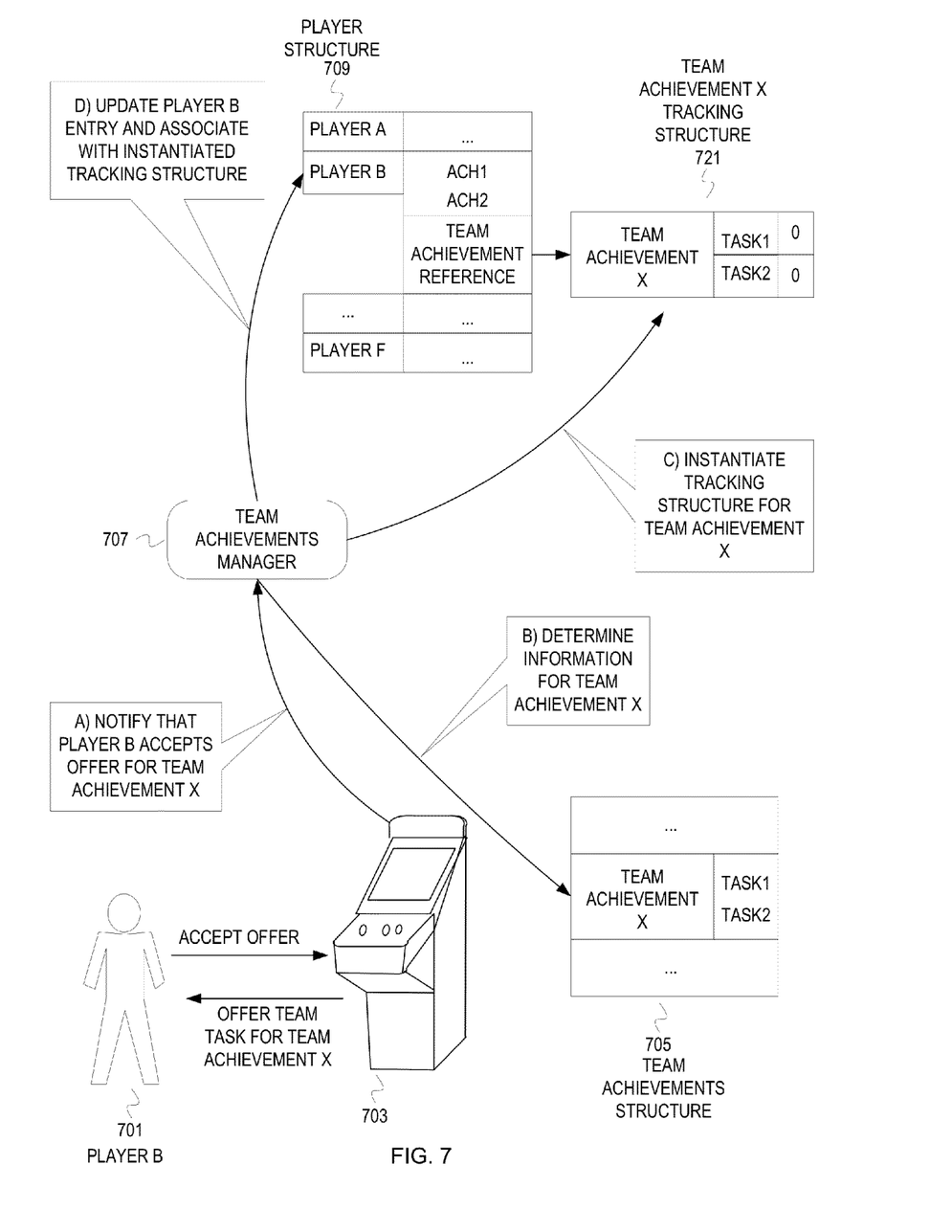
FIG. 7 depicts a conceptual example of a system assigning a team task to a player.

FIG. 7 depicts a conceptual example of a system assigning a team task to a player. A player B 701 triggers an offer to a team task to acquire a team achievement X from an electronic wagering game machine 703. Examples of triggers for a team task offer include a particular reel combination, achievement accumulation, activity in a wagering game establishment in combination with status/activity in an online social community, etc.

After the player B 701 accepts the offer, the wagering game machine 703 notifies a team achievements manager 707 at a stage A. The electronic wagering game machine 703 notifies the team achievements manager 707 of the player B 701 and the team achievement X being offered upon completion of the team task. As an example, the wagering game machine 703 can transmit a player account identification number and an identifier and/or name of the team achievement X to the team achievements manager 707.

The team achievements manager 707 determines information about the team achievement X at a stage B. The team achievements manager 707 accesses a team achievements structure 705. The team achievements manager 707 reads data about the team achievement X from an entry in the team achievements structure 705. In the depicted example, the data about the team achievement X includes an identifier (e.g., hash of an achievement name, serial number, etc.) and two tasks (e.g., register an account, acquire a particular achievement, add two people to a friend list in an online social community, earn awards from a third party vendor, etc.). The team achievements structure 705 can indicates rules, policies, conditions, other achievements, etc.

At a stage C, the team achievements manager 707 instantiates a tracking structure for the team achievement X offered to the player B 701 upon completion of a corresponding team task(s). In this case, the team achievements manager 707 instantiates a team achievement X tracking structure 721 based on the data from the entry read from the structure 705. The team achievements manager 707 populates the tracking structure 721 with the team achievement X identifier and indications of the tasks. The team achievements manager 707 instantiates the tracking structure 721 with fields to indicate status of the tasks (e.g., complete, partially complete, not yet assigned, etc.). In the depicted example, the fields are initialized with values of zero to indicate the tasks are not complete. Embodiments can also instantiate the tracking structure 721 with fields to indicate team members associated with the team achievement X, team member(s) assigned to a particular task, etc.

At a stage D, the team achievements manager 707 updates data for the player B 701 to associate the offer of team achievement X with the player B. The team achievements manager 707 accesses an entry for the player B 701 in a player structure 709. The player structure 709 indicates players and achievements granted to players and associated with players. The team achievements manager 707 updates the entry for the player B 701 to indicate that a team achievement X is offered, although not yet granted, to the player B 701. In this example, the team achievements manager 707 writes a reference to the instantiated tracking structure 721.

Figure 8:
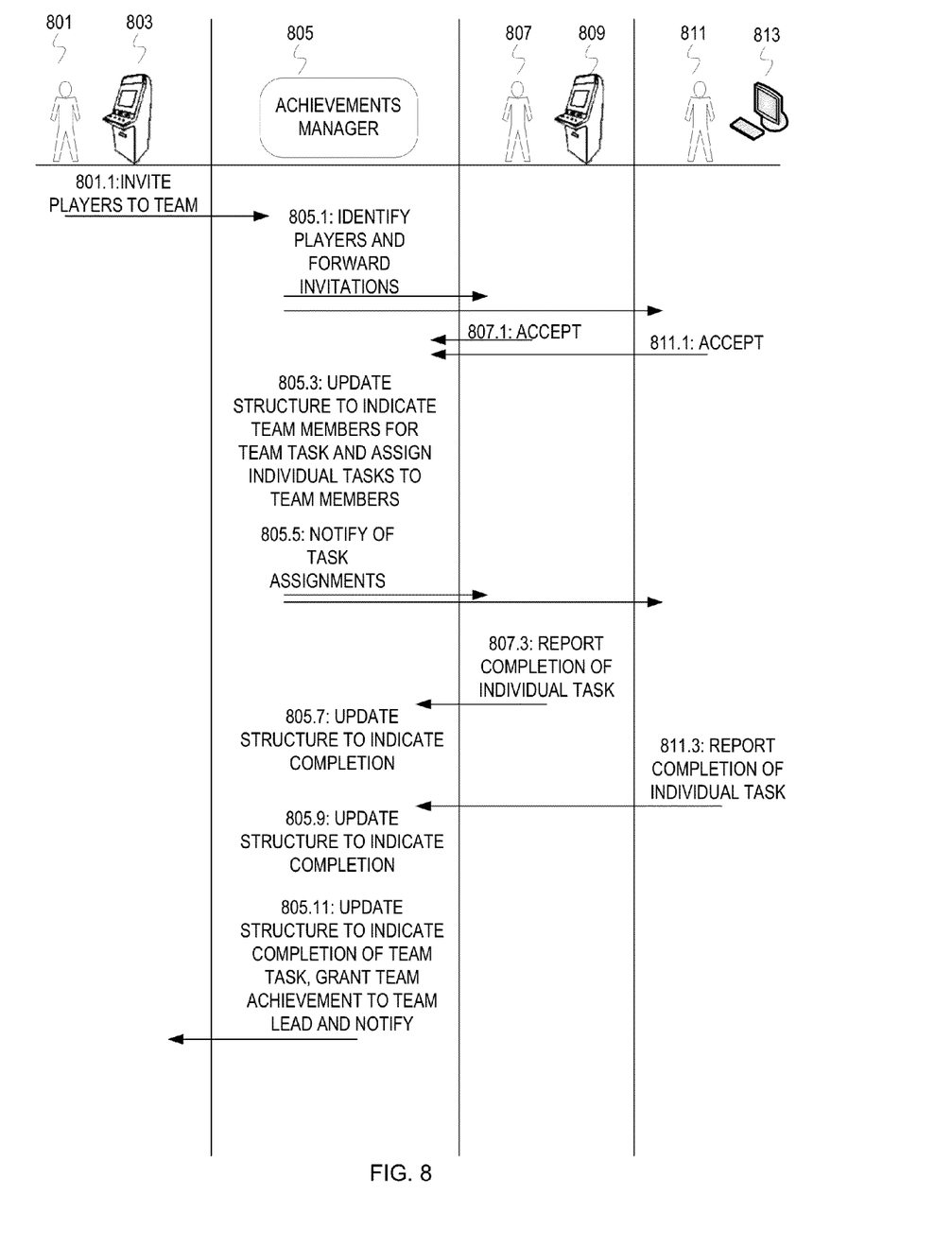
FIG. 8 depicts a conceptual diagram of players being invited to complete a team task for a team achievement and a team leader acquiring the team achievement.

FIG. 8 depicts a conceptual diagram of players being invited to complete a team task for a team achievement and a team leader acquiring the team achievement. A player 801 has accepted an offer of a team achievement upon completion of one or more tasks associated with the team achievement. To acquire the team achievement, the player 801 builds a team (e.g., friends in an online social community, strangers in a casino, colleagues in a wagering group, etc.). The player 801 invites players to join a team via an electronic wagering game machine 803 at 801.1. The electronic wagering game machine 803 transmits the invitations to an achievements manager (e.g., team achievements manager) 805. At 805.1, the achievements manager 805 forwards the invitations to two players 807, 811. The player 807 receives the invitation at an electronic wagering game machine 809. The player 811 receives the invitation at a computer 813 while logged into an online social community. At 807.1, the player 807 accepts the invitation. At 811.1, the player 811 accepts the invitation. Accordingly, the electronic wagering game machine 809 and the computer 813 transmit acceptance messages to the achievements manager 805.

A team leader can commence performing activities to acquire the team achievement X, although a team achievement may require at least partial establishment of a team before activities can commence. In FIG. 8, the team members (players 807, 811) perform activities to complete the tasks for the team achievements. At 805.3, the achievements manager 805 updates a structure for the team achievement to indicate the team members that have accepted invitations to participate. The achievements manager 805 also assigns tasks to the team members and indicates the assignments in the structure. At 805.5, the achievements manager notifies the players 807, 811 of the assignments.

The one or more tasks for a team achievement may involve a series of tasks, individual tasks, coordination, etc. Team members may or may not complete the tasks for the team achievement. In this example, the players 807, 811 complete their assigned individual tasks. At 807.3, the electronic wagering game machine 809 reports completion of the individual task assigned to the player 807 to the achievements manager 805. At 805.7, the achievements manager 805 updates the structure to indicate the task completion. At 811.3, the computer 813 reports completion of the individual task assigned to the player 811 to the achievements manager 805. At 805.9, the achievements, the achievements manager 805 updates the structure to indicate task completion. At 805.11, the achievements manager 805 updates the structure to indicate that the team task has been completed. In this case, the team task was completed when the individual tasks were completed. A team task, however, can involve additional conditions, tasks requiring coordination of team members, etc. For example, team member can acquire puzzle pieces, which are then assembled by the team. The achievements manager 805 updates the structure to indicate grant of the team achievement to the team leader, who is player 801 in this example. The achievements manager 805 transmit a notification to the player 801 (e.g., via mobile phone, the gaming machine 803, etc.), and transmits data for the gaming machine 803 to render the granted team achievement.

It should be understood that the example depicted in FIGS. 7 and 8 are intended to aid in understanding embodiments, and should not be used to limit embodiments. Invitations, acceptances, etc. can be delivered over a variety of infrastructures (e.g., wired, wireless, casino wagering game network, online social community, printed ticket, etc.) with a variety of devices (e.g., stationary wagering game machine, portable wagering game machine, mobile phone, gaming console, workstation, etc.). For example, a team leader can recruit team member by handing a printed ticket that indicates the offered team achievement (e.g., with a bar code). The recruited team member can then log into machines with the printed ticket to perform activities to complete a task for the team achievement. As another example, a code for the team achievement can be transmitted to communication devices of team members. The team members can enter the code to associate their activities with earning the team achievement.

As mentioned earlier, dynamic digital achievements can involve wagering game establishments, online social communities, and third party vendors (e.g., retail stores, restaurants, etc.). Granting and/or maintenance of a dynamic digital achievement can involve purchasing activity, customer loyalty programs, etc., in addition to gaming activity.

Figure 4:
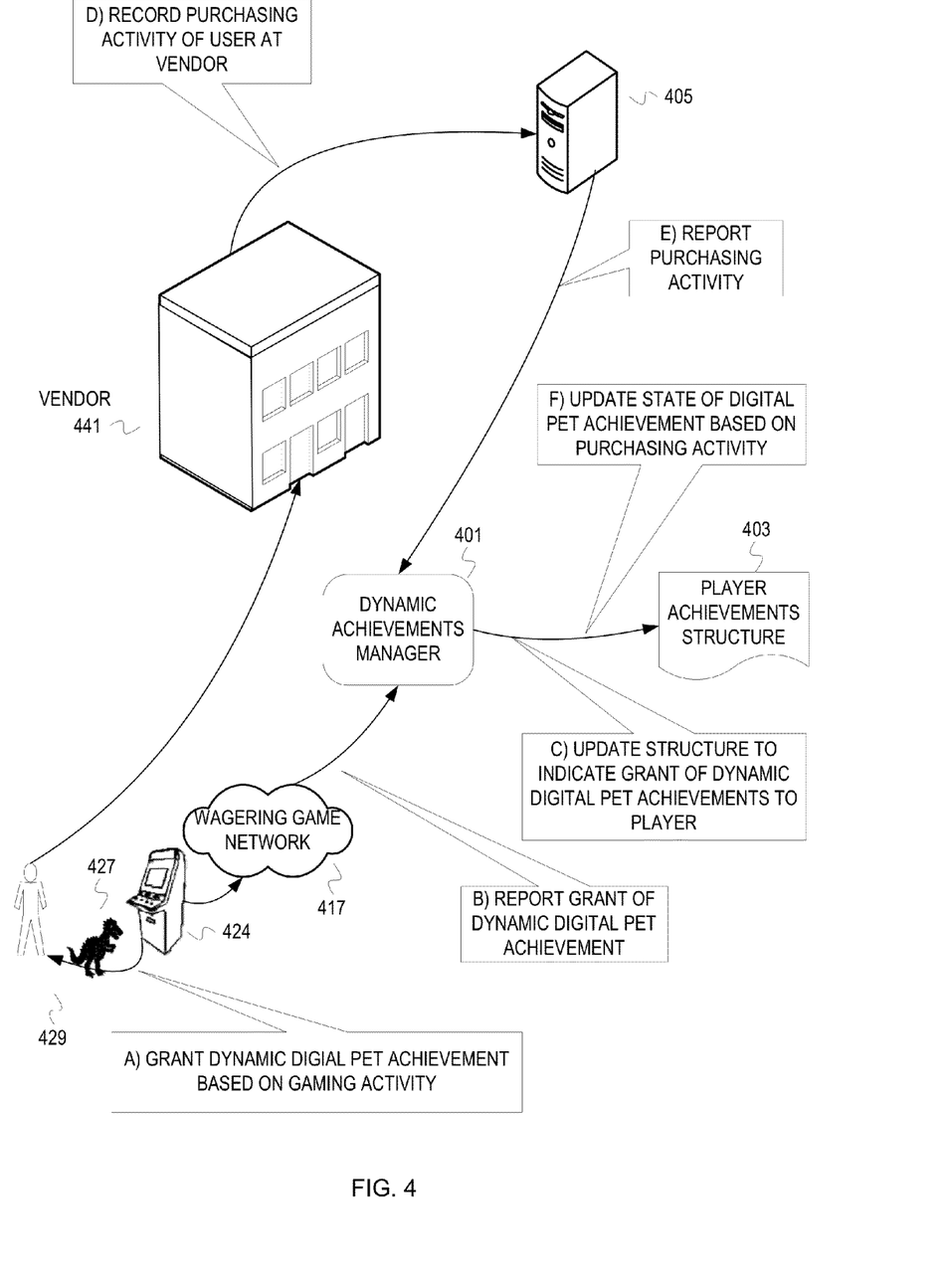
FIG. 4 depicts a conceptual diagram of purchasing activity being used to maintain a dynamic digital achievement.

FIG. 4 depicts a conceptual diagram of purchasing activity being used to maintain a dynamic digital achievement. At a stage A, an electronic wagering game machine 424 grants a dynamic digital pet achievement 427 to a player 429 based on gaming activity. At a stage B, the electronic wagering game machine 424 reports the grant to a dynamic achievements manager 401 via a wagering game network 417. At a stage C, the dynamic achievements manager 401 updates a player achievements structure 403 to indicate the grant of the pet achievement 427 to the player 429. For example, the dynamic achievements manager 401 adds an entry for the player 429 to the structure 402. The entry associates the player 429 with the pet achievement 427, and can indicate that the wagering game machine 424 and/or a wagering game establishment granted the pet achievement 427 to the player 429. The player 429 performs purchasing activity at a vendor 441 (e.g., café, retail store, etc.). The player 429 may purchase a product, a gift card, a service, etc. At a stage D, the purchasing activity of the user is recorded at or by a server 405. A variety of techniques can be used to determine identity of the player 429 at the vendor 441. Example techniques including using a name on a credit card, using a name associated with a gift card, using an account number or phone number associated with a customer loyalty program, using biometric data, etc. At a stage E, the server 405 reports the purchasing activity of the player 429 at the vendor 441 to the dynamic achievements manager 401. For instance, the server 405 transmits a message that indicates a code for the purchasing activity, purchase amount, and identity of player 429. At a stage F, the dynamic achievements manager 401 updates the structure 403 to indicate a state of the pet achievement. Examples of changes to state of a dynamic digital achievement include changing a data source for the dynamic digital achievement, write a reference to a different graphical image, writing a reference to new executable code, inserting code to be loaded into a dynamic digital achievements, inserting code to be used for modifying a dynamic digital achievement, etc.

It should be understood that the depicted operations in the above figures are examples meant to aid in understanding embodiments and should not be used to limit embodiments or limit scope of the claims. Embodiments may perform additional operations, fewer operations, operations in a different order, operations in parallel, and some operations differently. For instance, embodiments are not limited to reporting individual purchase activity. For instance, the server 405 can report enrollment of a person into a customer loyalty program of the vendor 441. The server 405 can report when the player satisfies given criteria to impact a dynamic digital achievement. For example, the server 405 may report when a player has made a purchase amount that exceeds a threshold or has accumulated customer loyalty points that exceed a threshold for updating a dynamic digital achievement. In addition, in some embodiments the operations can be performed by executing instructions residing on machine-readable media (e.g., software), while in other embodiments, the operations can be performed by hardware and/or other logic (e.g., firmware).

Wagering Game Machine Architectures

Figure 5:
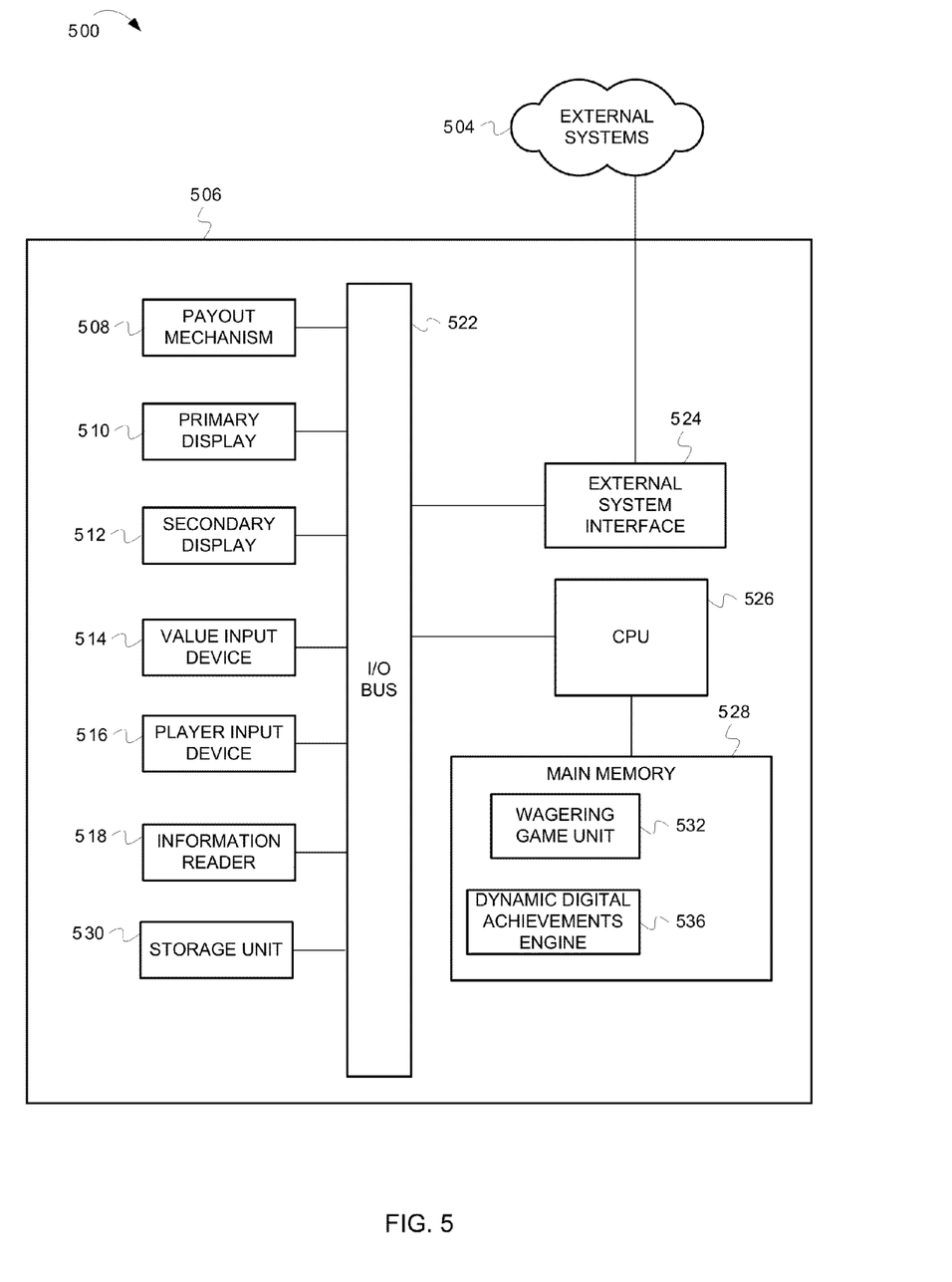
FIG. 5 is a block diagram illustrating a wagering game machine architecture, according to example embodiments of the invention.

FIG. 5 is a block diagram illustrating a wagering game machine architecture, according to example embodiments of the invention. As shown in FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532 and a dynamic digital achievements engine 536. In one embodiment, the wagering game unit 532 can present wagering games, such as video poker, video black jack, video slots, video lottery, etc., in whole or part. The dynamic digital achievements engine 536 can grant and render achievements that correspond to one or more wagering games. In some embodiments, the wagering game unit 532 handles at least one of granting and rendering of dynamic digital achievements. The dynamic digital achievements engine 536 communicates with a dynamic achievements manager for tracking of grants, retrieving achievements and updates for achievements, etc.

The CPU 526 is also connected to an input/output (I/O) bus 522, which can include any suitable bus technologies, such as an AGTL+frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and/or multiple CPUs 526. In one embodiment, any of the components can be integrated or subdivided.

Any component of the architecture 500 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 5 describes an example wagering game machine architecture, this section continues with a discussion of wagering game networks.

Wagering Game Networks

Figure 6:
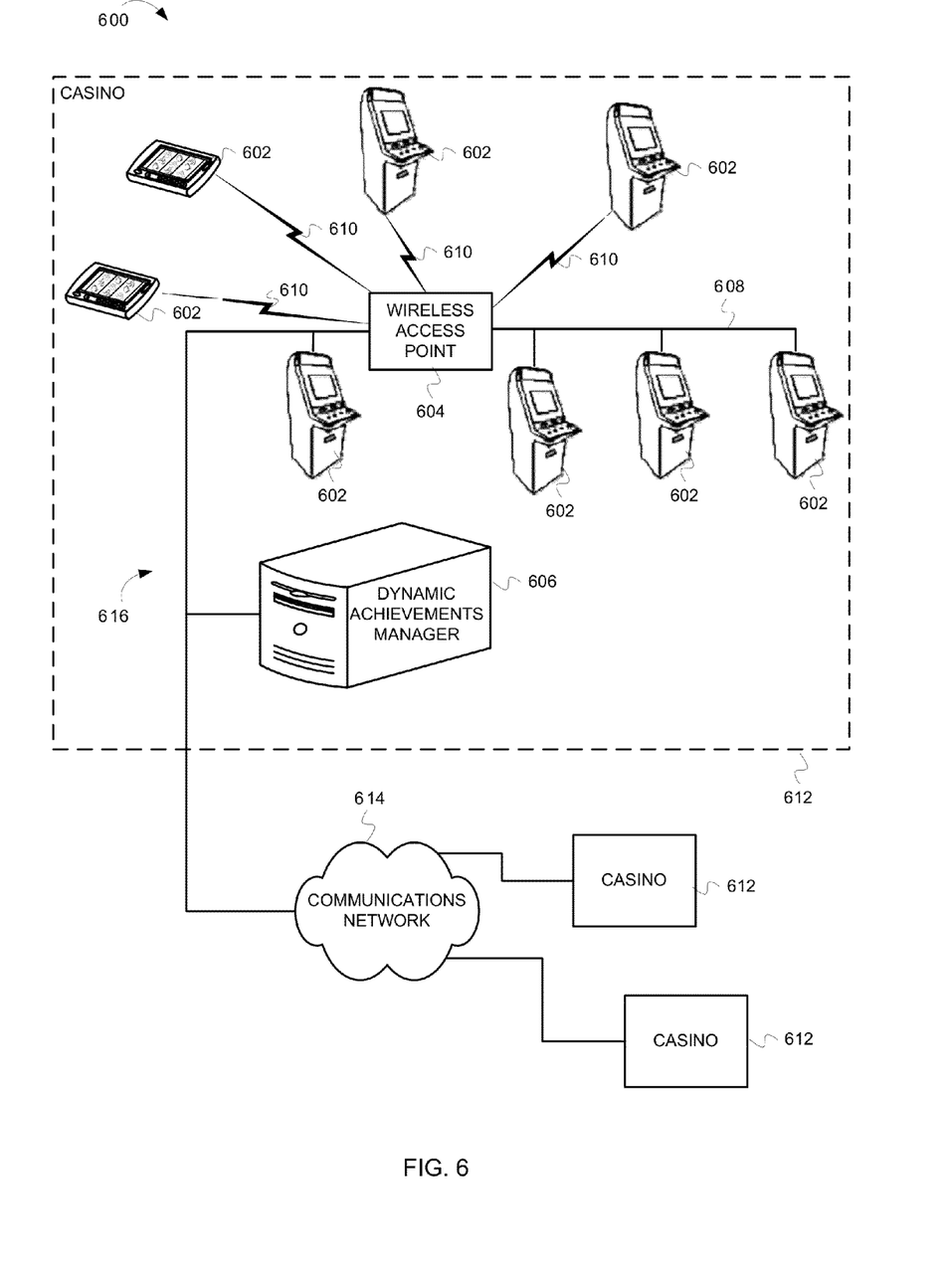
FIG. 6 is a block diagram illustrating a wagering game network 600, according to example embodiments of the invention.

FIG. 6 is a block diagram illustrating a wagering game network 600, according to example embodiments of the invention. As shown in FIG. 6, the wagering game network 600 includes a plurality of casinos 612 connected to a communications network 614.

Each casino 612 includes a local area network 616, which includes an access point 604, a wagering game server 606, and wagering game machines 602. The access point 604 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. The wagering game server 606 is configured to perform at least some of the functionality of a dynamic achievements manager.

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, wagering game machines 602 and wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player's account.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc.

Any of the wagering game network components (e.g., the wagering game machines 602) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

As used herein, the term "or" is inclusive unless otherwise explicitly noted. Thus, the phrase "at least one of A,B, or C" is satisfied by any element from the set {A,B,C} or any combination thereof, including multiples of any element.

The invention claimed is:

1. A method of operating a wagering game server, said method comprising:
   electronically connecting, via a network communication interface of the wagering game server, the wagering game server to a device via a communications network, wherein the device presents a wagering game, and wherein the wagering game is associated with a player account;
   detecting, via the network communication interface, an electronic indication of a wagering game event transmitted via the communications network from the device to the wagering game server, wherein the wagering game event is associated with a digital trophy of the player account, and wherein the digital trophy exhibits a first behavior at the device;

automatically determining, via an electronic processing unit of the wagering game server, an update for the digital trophy based, at least in part, on the wagering game event; and electronically transmitting, via the network communication interface, instructions to the device for the device to apply the update to the digital trophy, wherein the instructions, when executed by the device, cause the digital trophy to automatically overwrite one or more of code or content associated with the first behavior of the digital trophy, causing a second behavior to replace the first behavior.

2. The method of claim 1 further comprising:
before transmitting the instructions, determining whether social-network, player criteria associated with the player account has been satisfied.

3. The method of claim 2, wherein said determining whether the social-network, player criteria has been satisfied comprises determining whether an online social community reputation exceeds a threshold.

4. The method of claim 1 further comprising:
transmitting the instructions in response to determining whether an expiration date associated with the first behavior has expired.

5. The method of claim 1, wherein the instructions comprise at least one of program code to overwrite current program code of the digital trophy, content to overwrite current content of the digital trophy, additional program code for the digital trophy, additional content for the digital trophy, and one or more values to apply to the digital trophy.

6. The method of claim 1, wherein the wagering game event is associated with a social contact associated with the player account.

7. The method of claim 1, wherein the update comprises one or more of executable code, an image, a sequence of images, video, audio, or a reference.

8. The method of claim 1, wherein said automatically determining the update for the digital trophy comprises accessing a structure that tracks dynamic digital achievements, wherein the structure associates different updates with different combinations of dynamic digital achievements and events corresponding to wagering game activities.

9. The method of claim 1 further comprising evaluating data associated with the player account and the digital trophy against a policy to determine availability of the update.

10. The method of claim 1 further comprising:
determining purchasing activity associated with the player account at a vendor; and
determining that the purchasing activity is associated with the update, wherein the automatically determining the update in based at least in part on the purchasing activity.

11. The method of claim 1 further comprising transmitting the instructions in response to determining whether the wagering game event indicates that a wagering threshold has been exceeded by the player account.

12. A wagering game server comprising:
an electronic processing unit;
a network communication interface; and
a memory storage device configured to store program instructions executable by the electronic processing unit to cause the wagering game server to,
electronically connect, via the network communication interface, the wagering game server to a device via a communications network, wherein the device presents a wagering game, and wherein the device is associated with a player identifier, detect, via the network communication interface, an electronic indication of an event transmitted via the communications network from the device to the wagering game server, wherein the event is associated with a digital trophy associated with the player identifier, and wherein the digital trophy exhibits a first behavior at the device,
automatically determine an update for the digital trophy based, at least in part, on the event, and
electronically transmit, via the network communication interface, a message to the device to apply the update to the digital trophy, wherein the message causes the digital trophy to exhibit a second behavior different from the first behavior.

13. The wagering game server of claim 12, wherein the memory storage device is configured to store program instructions executable by the electronic processing unit to cause the wagering game server to:
before the message is transmitted, determine whether the second behavior of the digital trophy has already been granted a number of times greater than a threshold.

14. The wagering game server of claim 12, wherein the memory storage device is configured to store program instructions executable by the electronic processing unit to cause the wagering game server to, before the message is transmitted, one or more of determine whether a player status associated with a wagering game establishment exceeds a threshold or determine whether an online social community reputation exceeds a threshold.

15. The wagering game server of claim 12, wherein the program instructions further comprise program instructions executable by the electronic processing unit to cause the wagering game server to:
transmit the message in response to determining whether an expiration date associated with the first behavior has expired.

16. The wagering game server of claim 12, wherein the device comprises at least one of a mobile phone, a personal data assistant, a computer, an electronic wagering game machine, or a portable electronic wagering game machine.

17. The wagering game server of claim 12, wherein the player identifier comprises one of a mobile phone number, an RFID tag, an Ethernet address, or a temporary player identifier.

18. The wagering game server of claim 12, wherein the message causes the device to transmit the update to a second device associated with the player identifier.

19. The wagering game server of claim 12, wherein the message causes the device to automatically overwrite one or more of code or content associated with the first behavior of the digital trophy.

20. One or more machine-readable storage media having program instructions stored therein that are executable by an electronic processing unit of a wagering game server, the program instructions comprising program instructions to:
electronically connect, via a network communication interface of the wagering game server, the wagering game server to a device via a communications network, wherein the device presents a wagering game, and wherein the device is associated with a unique identifier;
detect, via the network communication interface, an electronic indication of a wagering game event transmitted via the communications network from the device to the wagering game server, wherein the wagering game event is associated with a digital trophy that exhibits a first behavior at the device;

automatically determine an update for the digital trophy based, at least in part, on the wagering game event; and electronically transmit, via the network communication interface, a message to the device to apply the update to the digital trophy, wherein the message causes the device to automatically write one or more of code or content associated with a second behavior of the digital trophy different from the first behavior.

21. The one or more non-transitory, machine-readable storage media of claim 20, wherein the program instructions further comprise program instructions to:

determine whether a policy allows a class of behaviors for the digital trophy to be granted for at least one of the wagering game event or the unique identifier.

22. The one or more non-transitory, machine-readable storage media of claim 20, wherein the unique identifier comprises a mobile phone number stored in a wagering game player account associated with the wagering game, and wherein the program instructions further comprise program instructions to electronically transmit the message to the device using the mobile phone number.

* * * * *